(12) United States Patent
Shankar et al.

(10) Patent No.: US 7,420,963 B1
(45) Date of Patent: Sep. 2, 2008

(54) METHOD AND APPARATUS FOR TESTING EMERGENCY RESPONSE SERVICE IN A TELEPHONY ENVIRONMENT

(75) Inventors: Jagannathan Shiva Shankar, Bangalore (IN); Muktevi Srinivas, Bangalore (IN); Vipin Kamra, Karntaka (IN); Scott Keagy, San Jose, CA (US); William Drew Gaskill, San Jose, CA (US); Aruna K. Muvvala, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1024 days.

(21) Appl. No.: 10/758,171

(22) Filed: Jan. 14, 2004

Related U.S. Application Data (63) Continuation-in-part of application No. 10/651,590, filed on Aug. 29, 2003.

(51) Int. Cl.
*H04L 12/06* (2006.01)
*H04L 12/28* (2006.01)
*H04L 12/56* (2006.01)

(52) U.S. Cl. ............... 370/352; 370/351; 370/401; 379/9; 379/10.02; 379/15.01; 379/45

(58) Field of Classification Search ............... 379/1.01, 379/9, 10.01, 10.02, 12–13, 15.01, 16–18, 379/22–22.01, 29.01, 32.01, 33, 37, 39, 45, 379/46; 370/352–356, 351, 401
See application file for complete search history.

(56) References Cited

U.S. PATENT DOCUMENTS

| | | | | |
|---|---|---|---|---|
| 5,579,368 | A | * | 11/1996 | van Berkum ............... 379/9.06 |
| 5,734,698 | A | * | 3/1998 | Kobayashi et al. ............ 379/45 |
| 6,792,080 | B1 | * | 9/2004 | Imperato et al. ......... 379/29.02 |
| 7,333,480 | B1 | * | 2/2008 | Clarke et al. ................ 370/352 |
| 2007/0238448 | A1 | * | 10/2007 | Gallagher et al. ......... 455/414.2 |

OTHER PUBLICATIONS

Cisco Systems, Inc., "Release Notes for Voice Health Monitor 1.0 on Windows 2000," Aug. 9, 2001, 78-11325-01, pp. 1-28.

(Continued)

*Primary Examiner*—Binh K Tieu
(74) *Attorney, Agent, or Firm*—Hickman Palermo Truong & Becker LLP (57) ABSTRACT

A test emergency response location (ERL) is used to exercise an emergency response (ER) service. The test ERL does not have any connections to the real external PSAP or OSAN and only routes the call to synthetic phones or agents. A 911 call is intercepted and routed to an ER application to make a decision on which emergency location identification number (ELIN) to use. The ER application recognizes the call originator as a synthetic phone or agent and routes it through the test ERL. In one embodiment, the test ERL is configured so that a second synthetic phone or agent is registered as the PSAP endpoint and a third synthetic phone or agent is registered as the OSAN endpoint. In a properly functioning system, the ER application forwards the call to the second and third agents. When the second and third agents receive the calls, the system is considered to be functioning properly.

21 Claims, 6 Drawing Sheets

OTHER PUBLICATIONS

Cisco Systems, Inc., "Release Notes for Voice Health Monitor 1.1 on Windows 2000," Mar. 13, 2002, 78-11325-02, pp. 1-28.

Cisco Systems, Inc., "Voice Health Monitor User Guide," Chapter 2, "Monitoring Voice Network Health," Mar. 13, 2002, 78-11324-01, pp. 2-1-2-20.

Cisco Systems, Inc., "Voice Health Monitor User Guide," Chapter 6, "Synthetic Transaction Configuration," Mar. 13, 2002, 78-11324-01, pp. 6-1-6-12.

Cisco Systems, Inc., "Release Notes for Cisco CallManager Release 3.0(7)," Jan. 16, 2001, OL-0950-01, pp. 1-62.

Cisco Systems, Inc., "Release Notes for Cisco CallManager Release 3.2(2c)," Jul. 10, 2002, OL-2559-02, pp. 1-66.

BMC Software, Inc., "Synthetic Transaction Monitor," Release Notes, Version 1.1.00, Jun. 30, 2000, pp. 1-8.

BMC Software, Inc., "Synthetic Transaction Monitor," Release Notes, Version 1.1.06, Mar. 30, 2001, pp. 1-5.

Cisco Systems, Inc., "Troubleshooting Cisco Emergency Responder," Chapter 6, Cisco Emergency Responder Administration Guide 1.1(4), Jan. 19, 2003, pp. 6-1-6-38.

* cited by examiner

METHOD AND APPARATUS FOR TESTING EMERGENCY RESPONSE SERVICE IN A TELEPHONY ENVIRONMENT

CROSS REFERENCE TO RELATED APPLICATION

This application claims priority as a continuation-in-part of U.S. patent application Ser. No. 10/651,590 filed Aug. 29, 2003 by Jagannathan Shiva Shankar, Aruna K. Muvvala and Stephen Schleimer, entitled "Method and Apparatus for Measuring Health and Performance of a Messaging System", which is incorporated by reference in its entirety for all purposes as if fully set forth herein.

FIELD OF THE INVENTION

The present invention generally relates to communication networks. The invention relates more specifically to a method and apparatus for testing an emergency response service in a telephony environment, such as IP or wireless telephony.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Internet Protocol (IP) telephony is a technology that is being widely implemented and gaining widespread acceptance. However, requirements for deployment of IP telephony systems in many countries include the ability to locate emergency callers and to forward emergency calls to appropriate public safety agencies. Hence, emergency response systems' ability to track user and phone location changes add to the power of IP telephony systems.

Emergency Response Service

Emergency systems are critical in any environment, as such systems are a matter of life and death. Countries like the United States have created a 911 concept through which a user can ask for help during an emergency. The 911 center that receives the call must be able to determine the location of the user and dispatch help from the closest location possible. In the case of IP telephony, the user can move his phone from one location to another and seamlessly use all the offered IP telephony services. Thus, when a user moves from one location to another, the location must be tracked and provided to emergency personnel. This makes IP-based 911 systems complex.

In a series of orders since 1996, the Federal Communications Commission (FCC) has taken action to improve the quality and reliability of 911 emergency services for wireless phone users. E911 (sometimes referred to as E.911) refers to "enhanced 911" for wireless services. An important feature of E911 services is to provide emergency services personnel with location information that will enable them to locate and provide assistance to wireless 911 callers much more quickly.

Such a feature is equally important and relevant to IP telephony environments. For example, assume a hypothetical scenario in which a telecommuter has an IP phone that is registered with a call manager in City A but who is physically located in City B. In such a scenario, emergency personnel in City B would need to be notified of an incoming 911 or emergency call because that is where the emergency exists, rather than at the location of the call manager, i.e., City A. Hence, VoIP emergency response ("ER") services or applications provide an E911 facility for users in IP telephony environments. Furthermore, efficient 911 response is not always ensured on large PBX systems at corporations, universities and other organizations with extensive private phone switchboards. Unlike a residential phone, business phones are often not linked directly with the nation's dispatch system for fire, police and medical help and the location of such a phone is not registered in the 911 system's automatic location information (ALI) database, which helps dispatchers capture the exact location of an emergency caller.

ER applications typically perform the following, in the context of the group of users to which an application is serving: (1) accept or intercept calls initiated to 911; (2) determine the location of the caller; (3) determine the local line that actually needs to be called for the emergency, e.g., the PSAP (Public Safety Answering Point) associated with the location from which the caller made the 911 call; (4) route the call to the local line; and (5) maintain the ID and location of the caller so that the PSAP can call back if necessary. In addition, some ER applications also route the call to an associated OSAN (On-Site Alert Number). A PSAP refers to a physical location where 911 calls are received and then routed to the proper emergency services. An OSAN refers to a location within an organization where a notification is sent when a 911 call is made by a user within the organization.

One commercially available emergency response application or service is Cisco Emergency Responder (CER) available from Cisco Systems, Inc., which can quickly determine which Ethernet switch port is connected to a roaming caller's IP phone. In general, CER matches the MAC addresses of Ethernet switch ports currently connected to IP phones with the MAC addresses and associated phone extensions of the IP phones registered in a device acting as a VoIP call manager. More specifically, when CER is initially configured, a network manager defines emergency response location (ERL) entities for individual Ethernet switch ports across the network. ERL information includes the switch port number, street address, building name, floor number, room number, emergency contact personnel, and other information relevant to that port. From there, an emergency location identification number (ELIN) is associated with each ERL. The CER uploads the ELINs to the local service provider's ALI database. At the time of an emergency call, the caller's IP phone number, listed in the call manager database, is translated by the CER into the ELIN of the port to which it is connected.

The foregoing discussion illustrates that ER applications provide extremely important lifeline services. However, ER applications typically are the least-exercised component of a VoIP service and, therefore, are susceptible to unnoticed failures. For example, 911 systems are rarely used in a "production" situation, which is during an actual emergency, so it is possible that the system may not be functioning, unbeknownst by the administrator of the system. This leads to situations where one cannot summon help when required. Furthermore, it is often illegal for a network administrator or management system to make "dummy" 911 calls to check the system.

Based on the foregoing, there is a clear need for a technique for proactively and non-intrusively monitoring the performance and functionality of an emergency response service in an IP telephony environment.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for testing an emergency response system in a network telephony environment is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Operating Environment Example-Emergency Response
3.0 Method For Testing VoIP Emergency Response Service
   3.1 Process For Testing An Emergency Response Service
   3.2 Process For Testing A Gateway Associated with An Emergency Response Service
4.0 Implementation Mechanisms
   4.1 Hardware Overview
5.0 Extensions and Alternatives 1.0 General Overview Techniques for testing an emergency response service in a telephony environment, are described. Agents acting as telephony endpoints are registered with a network. Such agents may be executing on telephone hardware or on a computing system, for example. A process is performed by two or more agents to test various aspects of the emergency system that enables the emergency response service.

Generally, a test ERL is used to exercise the emergency response (ER) service from a synthetic phone. The test ERL does not have any connections to the real external PSAP or OSAN and only routes the call to other synthetic phones. When a synthetic phone makes a 911 call, a call agent intercepts it and sends it to an ER application to make a decision on which ELIN to use. The ER application recognizes this as a synthetic phone, which could be based on MAC address, IP address or any other criteria, and routes it through the test ERL. In one embodiment, the test ERL is configured so that a second synthetic phone or agent is registered as the PSAP end point and a third synthetic phone or agent is registered as the OSAN endpoint. In a properly functioning system, the ER application forwards the call to the second and third agents. When the second and third agents receive the calls, the system is considered to be functioning properly.

Another application of the techniques described herein is when a network manager wants to configure an ER system and wants to make sure the phones are correctly mapped from their correct locations to the correct numbers in the ERL-ELIN configuration. Again, synthetic phones or agents are registered as the PSAP and OSAN endpoints and an emergency call is made from any of the phones. If the respective calls are received by the agents, then the configuration is considered correct. If not, then the configuration can be revised to include the correct mappings.

In one embodiment, an emergency response (ER) service is tested by registering with the ER service (1) an agent as a PSAP endpoint, and (2) a phone system, real or synthetic. A mapping of a public emergency line number, such as 911, to a test emergency response location (ERL) is created and registered with the ER service. A call is initiated to the public number from the registered phone system and it is determined whether the call is routed by the ER service, based on the mapping, to the agent acting as the PSAP. In another embodiment, a second agent is registered as an OSAN with the ER service and it is determined whether the call is properly routed by the ER service to the second agent.

In one embodiment, a gateway that is coupled between an IP-based network and the PSTN and that is associated with an emergency response service, is tested. A phone system is registered, with the emergency response service, as a PSAP on the PSTN. The phone system is configured to answer incoming calls with a voice mail system and a call is initiated from the phone system, or an agent thereof, to a public emergency line number such as 911. By accessing the voice mail system, it is then determined whether the call was properly routed by the gateway to the voice mail system via the phone that is registered as the PSAP endpoint.

The described processes can be automatically performed at specified times or after specified intervals of time. Furthermore, the actual public emergency system, i.e., the 911 system, is not exercised in these test scenarios, but is bypassed through use of test ERL. Therefore, the techniques for testing the emergency response service are non-intrusive to the public emergency system.

Figure 1A:
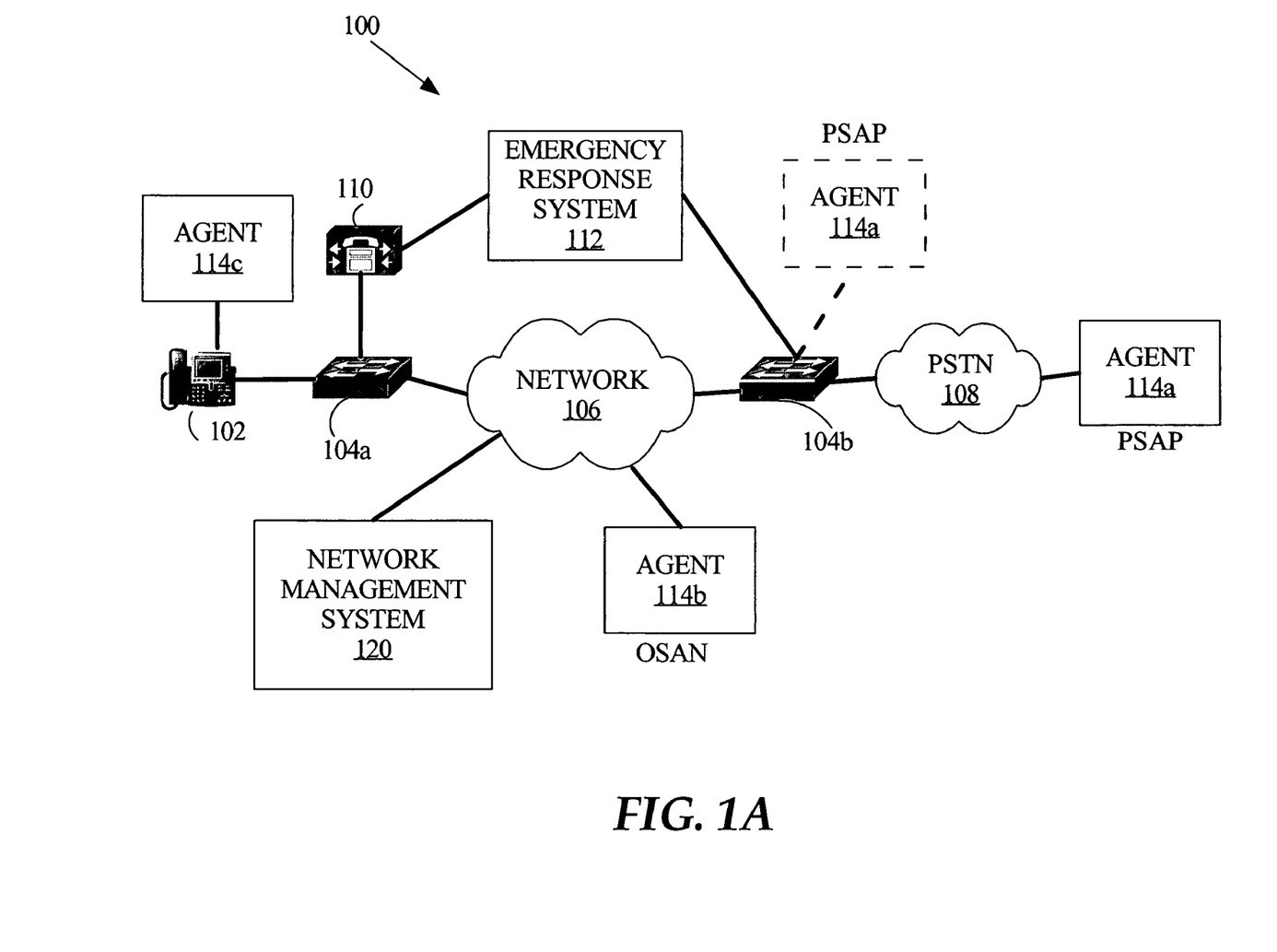
FIG. 1A is a block diagram that illustrates an example operating environment in which an embodiment may be implemented.

2.0 Structural and Functional Overview 2.1 Operating Environment Example-Emergency Response FIG. 1A is a block diagram that illustrates an example operating environment 100 in which an embodiment may be implemented.

In environment 100, a phone 102 is communicatively coupled to a series of network components constituting a network 106. For example, phone 102 is an IP phone that communicates over a communications network 106, such as the public Internet or an enterprise LAN or WAN, using one or more IP telephony protocols. For another example, phone 102 is a personal computer on which software executes to provide IP telephony services and functionality. Non-limiting examples of suitable communication protocols that are utilized by phone 102 include ITU-T H.323, SIP (Session Initiation Protocol), MGCP (Media Gateway Control Protocol), SCCP (Signaling Connection Control Part).

Phone 102 is coupled to a gateway 104a, or some switching means, for communicating through network 106. For example, if phone 102 is an IP phone and network 106 is a packet-switching network, then a gateway 104a is coupled between phone 102 and network 106. If phone 102 is a conventional phone and network 106 is a circuit-switching network, such as a PSTN, then element 104a is a switching device, such as a private branch exchange (PBX). For purposes of discussion herein, phone 102 is an IP phone coupled to a packet-switching network 106 via a gateway 104a. However, application of the techniques described herein for testing an emergency response service is not limited to an IP-based packet-switching environment.

The communications network 106 may contain any number of network infrastructure elements including routers, switches, gateways, etc. For example, the network 106 that communicatively connects phone 102 to PSTN 108 and ultimately to a PSAP, includes or is coupled to gateways 104a, 104b. In one embodiment, the network is a TCP/IP network in which infrastructure elements execute a conventional routing protocol for routing packets among the infrastructure elements. Although embodiments are described herein with reference to the TCP/IP protocol, implementations are not limited to use of TCP/IP. Rather, other network communication protocols, including protocols that are not yet developed, may be used to implement these techniques.

In an implementation, environment 100 further comprises a call manager 110 for processing IP telephony calls. Hence, as illustrated in FIG. 1A, phone 102 is served by call manager 110 and, therefore, is registered with call manager 110. Refer to call manager 110, which is described in reference to FIG. 1, for further details of a call manager such as call manager 110. One non-limiting example of a call manager 110 is Cisco CallManager from Cisco Systems.

In an embodiment that includes a call manager 110, the call manager 110 has a routing pattern for an emergency response (ER) system 112. Hence, emergency calls placed from phone 102, such as 911 calls, are routed by call manager 110 to ER 112. Such routing may be through network 106 or may be outside of network 106, such as in scenarios in which there is a direct software or hardware communication link between call manager 110 and ER 112.

Figure 4:
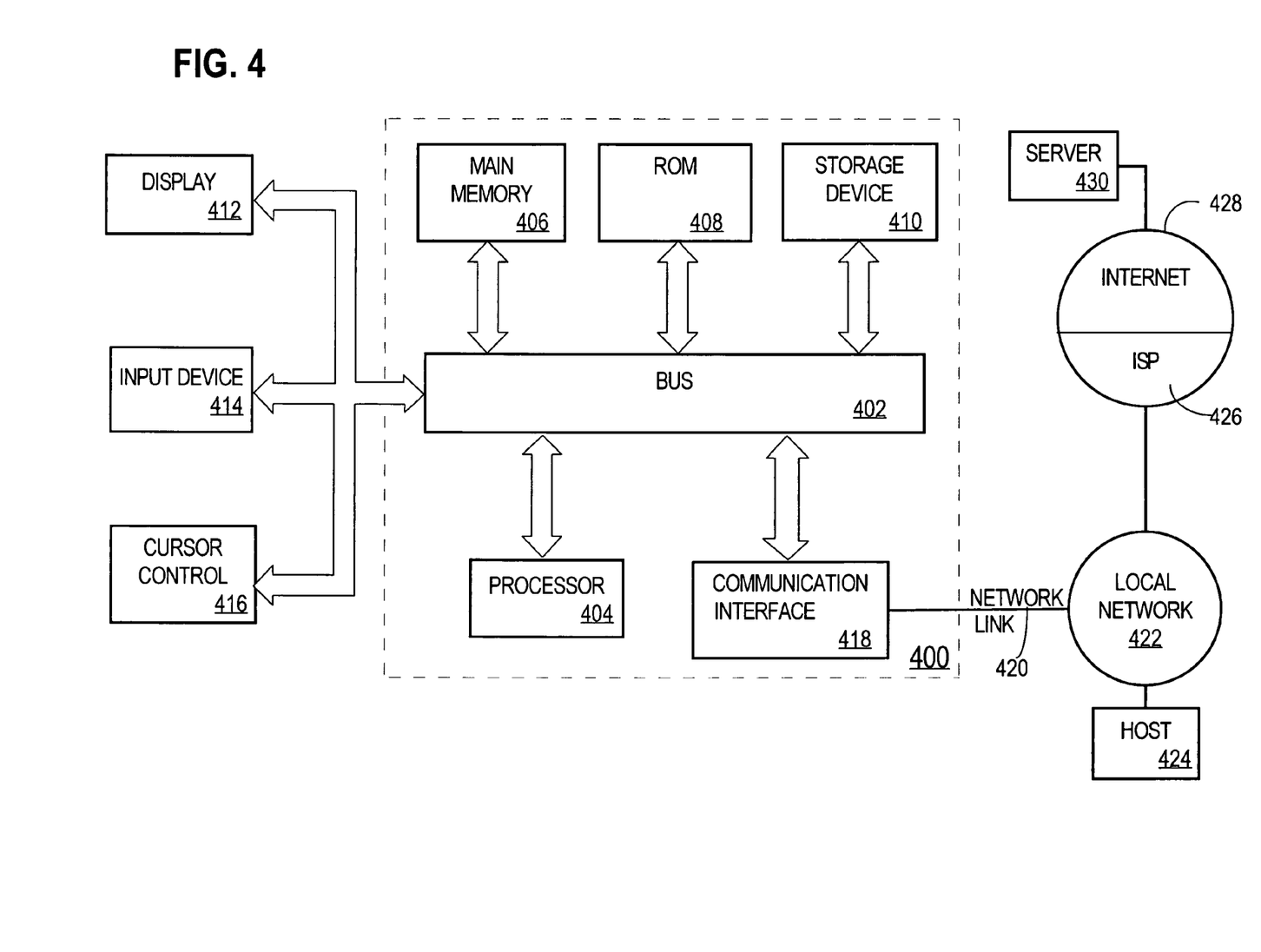
FIG. 4 is a block diagram that illustrates a computer system upon which an embodiment may be implemented.

ER 112 is a software module or component that is executable on a conventional computing system, such as computer system 400 of FIG. 4. ER 112 provides the emergency response service that is tested using techniques described herein. The configuration of emergency response system 112 may vary from implementation to implementation. For example, ER 112 may be installed on a convergence server, such as Cisco Media Convergence Server from Cisco Systems, along with call manager 110 and messaging server 108. Various functions that are performed by the ER 112, as well as relevant network infrastructure elements, are tested using techniques described in reference to FIG. 2A and FIG. 2B.

ER 112 is communicatively coupled to a gateway 104b, which is coupled between network 106 and PSTN 108. Gateway 104b operates to route or forward emergency calls placed by phone 102 to the PSTN 108, for ultimate routing to a PSAP. Such routing is typically through network 106, to which gateway 104b operates as an interface with PSTN 108.

The techniques described herein for testing an emergency response service, such as that enabled by ER 112, are implemented using agents, such as agent 114a and agent 114b. Agents 114a, 114b are software modules, components or routines, and may be referred to as "synthetic clients" or "skinny clients". Agents 114a, 114b may execute on any suitable computing system, such as computer system 400 (FIG. 4). In an embodiment, agent 114a is configured on a computing system that is coupled to the PSTN 108. This configuration allows testing ER 112 with respect to its operational ability to properly forward emergency calls to a PSAP that is an endpoint on the PSTN 108. In another embodiment, agent 114a is configured on gateway 104b, which is coupled between network 106 and PSTN 108. This configuration allows testing ER 112 with respect to its operational ability to properly forward emergency calls to a PSAP that is not an endpoint on the PSTN 108. The functionality of each of agents 114a, 114b, 114c is described in reference to FIG. 2A and FIG. 2B.

Figure 2A:
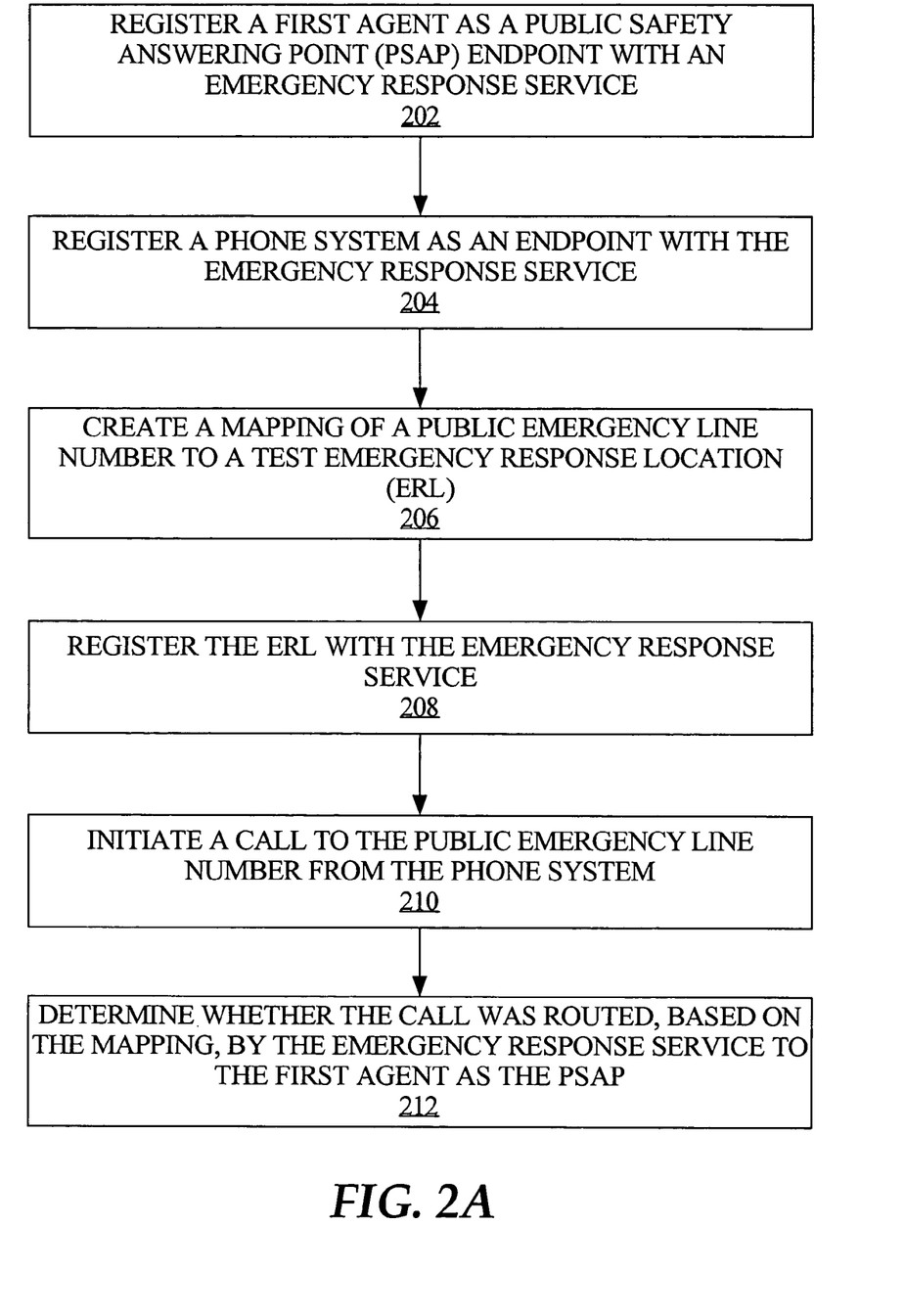
FIG. 2A is a flow diagram that illustrates a process for testing an emergency response service.
Figure 2B:
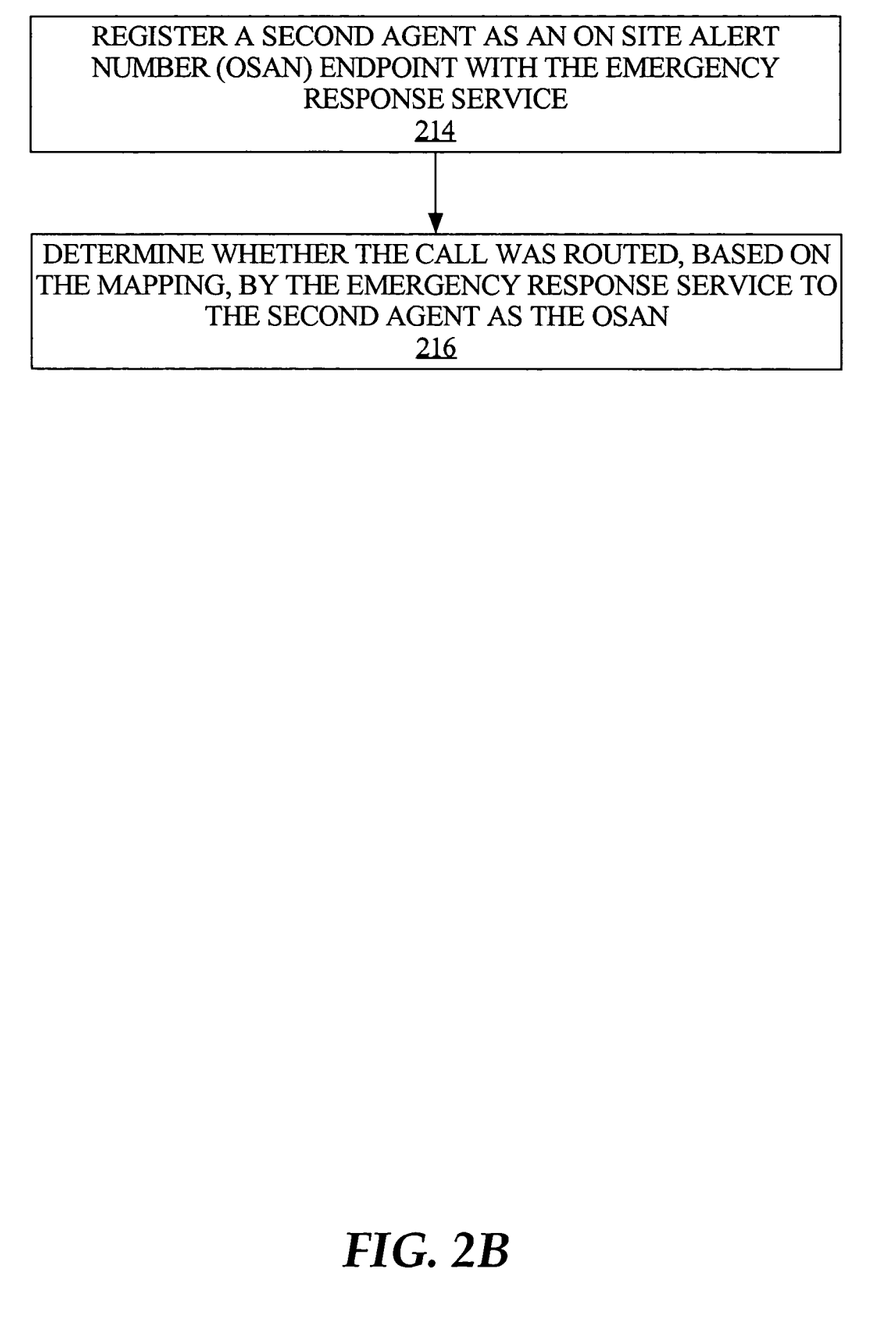
FIG. 2B is a flow diagram that further illustrates the process for testing an emergency response service or system that is illustrated in FIG. 2A.

Phone 102 may be associated with an agent 114c, where agent 114c operates to initiate calls at specified intervals, according to embodiments described in reference to FIG. 2A and FIG. 2B. An administrator, for example, can specify such intervals for testing of ER 112 according to such embodiments.

Environment 100 may comprise optional network management system 120. Such a software tool may be implemented to execute on a gateway, such as gateway 104a, or on any suitable computing system connected to network 106, such as a computer system 400 (FIG. 4). However, the component on which it executes is not important and may vary from implementation to implementation. Network management system 120 can be a known tool used for managing network elements such as routers, gateways, gatekeepers, servers and the like. A suitable network management system is Cisco IP Telephony Environment Monitor from Cisco Systems. The presence of a network management system 120 is not critical to implementation of the techniques described herein. However, information obtained by a network management tool, such as from MIBs, may be correlated with information obtained by agents 114a, 114b to isolate and diagnose network and/or emergency response system faults. Furthermore, information or results from agents 114a, 114b may be integrated with and displayed with results from network management system 120, for example, as part of a fault management system user interface associated with network management system 120.

Figure 1B:
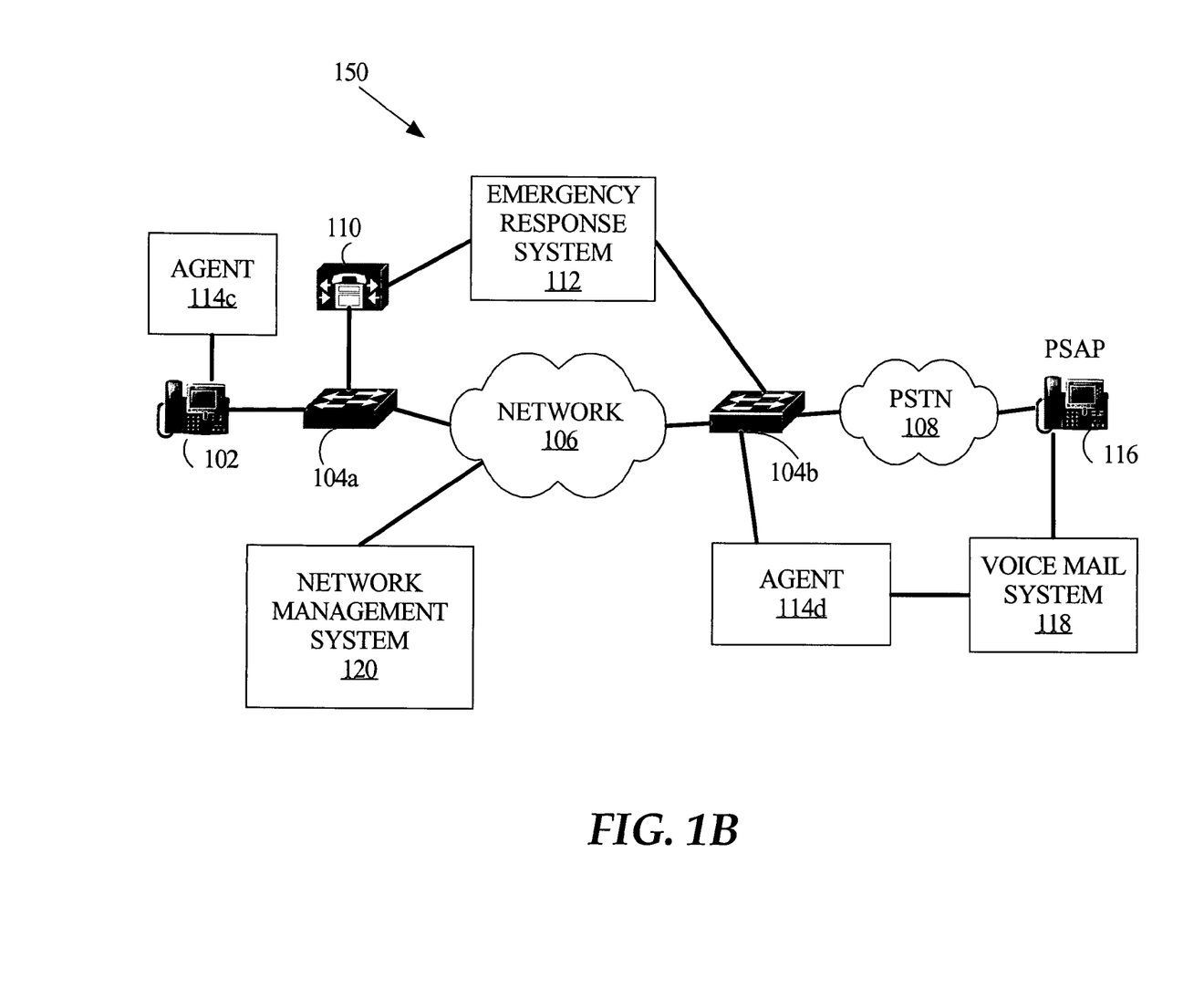
FIG. 1B is a block diagram that illustrates an example operating environment in which an embodiment may be implemented.

FIG. 1B is a block diagram that illustrates an example operating environment 150 in which an embodiment may be implemented. Operating environment 150 is similar to operating environment 100 (FIG. 1A) in many ways, and reference is made thereto for descriptions of similar components. Therefore, only differences between the respective operating environments are described in reference to FIG. 1B.

Operating environment 150 includes phone 116, voice mail (VM) system 118 and agent 114d, which are described in reference to FIG. 2B. Operating environment 150 does not include agent 114a serving as a PSAP or agent 114b serving as an OSAN, as in operating environment 100. Operating environment 150 is configured with phone 116 communicatively coupled to PSTN 108 and, in an embodiment, serving as a PSAP. Phone 116 is further communicatively coupled to VM system 118, which can be any conventional voice mail system running on any suitable platform, and which serves the voice mail needs of phone 116. Agent 114d is communicatively coupled to VM system 118, for detecting whether a call is properly transferred to VM system 118 according to an embodiment. For example, agent 114d may execute on gateway 104b for communicating with VM system 118 through PSTN 108, as shown, or may execute as an agent on VM system 118 and its associated computing system for direct communication between respective software modules.

3.0 Method for Testing VoIP Emergency Response Service

3.1 Process for Testing an Emergency Response Service

According to one aspect, a test is configured to test an emergency response service or mechanism that is associated with a VoIP service. Generally, techniques described herein test any and/or all of the following with respect to an ER system, such as ER 112 (FIGS. 1A and 1B): (1) routing of emergency calls to the ER by a call manager, such as call manager 110 (FIGS. 1A and 1B); (2) forwarding of emergency calls to PSAP and OSAN endpoints; (3) the gateway used to forward the emergency calls to the PSTN 108 (FIGS. 1A and 1B); and (4) the location-tracking feature.

Generally, a synthetic transaction engine (STE) executing in association with agent 114*c* on phone 102 (FIGS. 1A and 1B), places a call to an emergency number, such as a target number used for testing purposes. Agents, such as agent 114*a*, 114*b* (FIG. 1A) and 114*d* (FIG. 1B), respectively, monitor the PSAP, the OSAN and the VM system 118 (FIG. 1B) for a resultant incoming call. Monitoring of the OSAN is optional, as some enterprises may choose not to support an OSAN in their campus, or the PSAP and the OSAN may be registered to different call managers. Therefore, such a process may be implemented as separate tests, where one test is applicable to the PSAP only and another test is applicable to the PSAP and OSAN.

Furthermore, in an embodiment, the test(s) are executed automatically and periodically. If the tests are implemented as separate tests, then they may be executed at different frequencies. For example, the PSAP+OSAN test may be executed less frequently than the PSAP-only test due to the increased load that such a test imparts on the system and the consequent possibility that fewer real emergency calls may complete because of this increased load on the system.

FIG. 2A is a flow diagram that illustrates a process for testing an emergency response service, or system. The process of FIG. 2A may be performed by a network management system, such as NMS 120 (FIG. 1A), controlling one or more software agents, such as agent 114*a*, 114*c* (FIG. 1A).

At block 202, a first software agent is registered as a public safety answering point (PSAP) endpoint with an emergency response service. For example, agent 114*a* is registered as a PSAP with ER 112.

At block 204, a phone system is registered as an endpoint with the emergency response service. For example, phone 102 or an associated agent 114*c* is registered with ER 112.

At block 206, a mapping is created, which maps a public emergency line number to a test emergency response location (ERL). For example, 911 calls from the phone system 102 are mapped for routing to a virtual ERL.

At block 208, the test ERL is registered with the emergency response service, such as ER 112. Thus, if functioning properly, upon receiving a 911 call, the ER 112 uses the mapping to determine that a 911 call from the phone system endpoint is to be routed to the test ERL, and routes the call accordingly. At block 210, a call to the public emergency number is initiated from the phone system. For example, 911 is dialed from phone 102 or agent 114*c*. Software implementing the method of FIG. 2A may automatically initiate the 911 call; that is, human action is not required to perform block 210. Because of the mapping established at block 206, a properly functioning network should route the call to the test ERL and then to the first agent as the PSAP.

At block 212, it is determined whether the emergency call was properly routed, based on the mapping, by the emergency response service to the first agent as the PSAP. For example, agent 114*a* determines whether it received the call and, if so, that the ER 112 is operating properly with respect to PSAP routing. If agent 114*a* does not receive the call, then the ER 112 is not operating properly.

FIG. 2B is a flow diagram that further illustrates the process for testing an emergency response service or system that is illustrated in FIG. 2A. The portion of the process that is illustrated in FIG. 2B uses agent 114*b*, in addition to agent 114*a* (FIG. 1A).

At block 214, a second agent is registered as an on site alert number (OSAN) endpoint with an emergency response service. For example, agent 114*b* is registered as an OSAN with ER 112.

At block 216, it is determined whether the emergency call was properly routed, based on the mapping, by the emergency response service to the second agent as the OSAN. For example, agent 114*b* determines whether it received the call and, if so, that the ER 112 is operating properly with respect to OSAN routing. If agent 114*b* does not receive the call, then the ER 112 is not operating properly.

Figure 3:
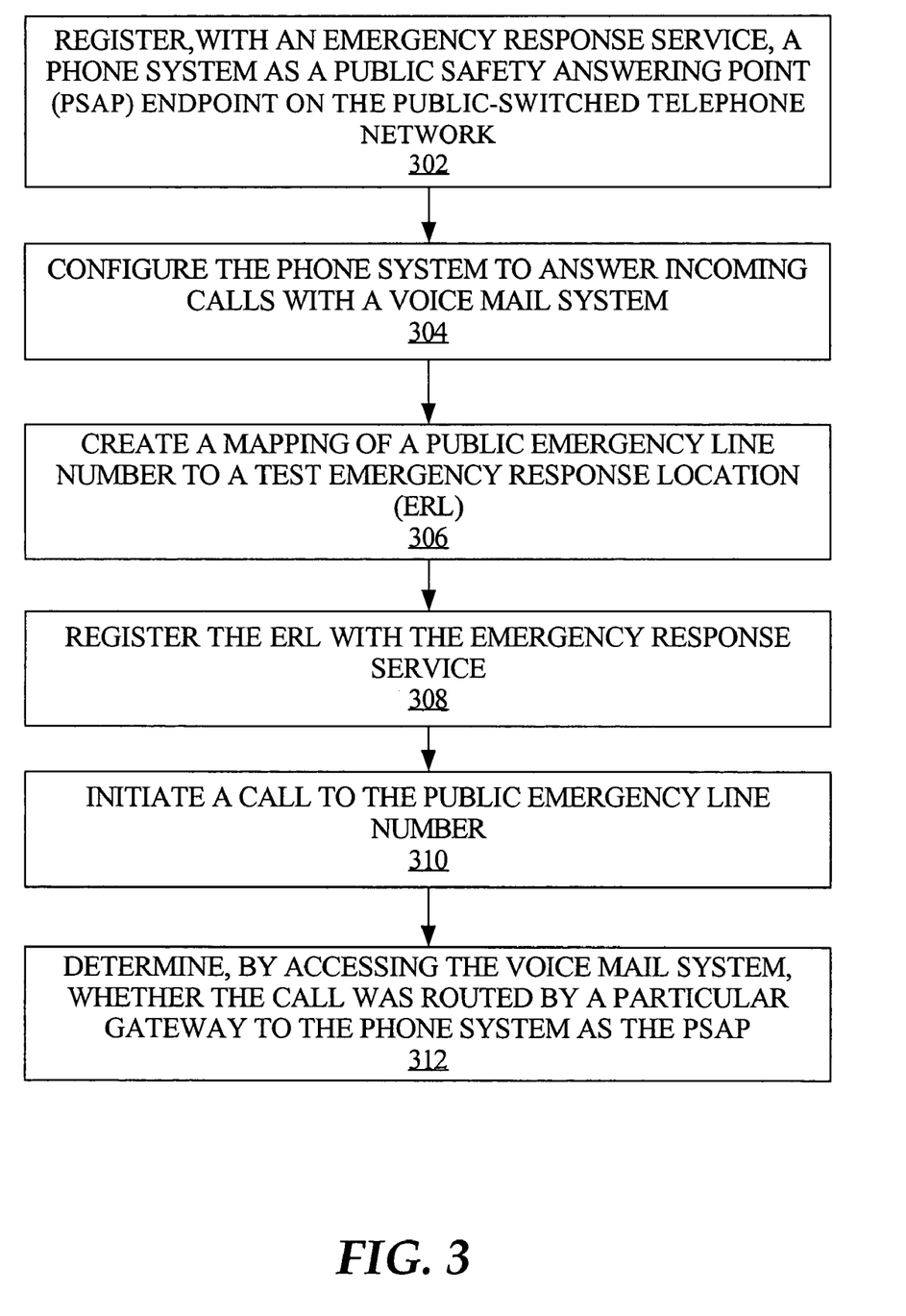
FIG. 3 is a flow diagram that illustrates a process for testing a gateway that is coupled to a public-switched telephone network and that is associated with an emergency response service or system.

3.2 Process for Testing a Gateway Associated with an Emergency Response Service FIG. 3 is a flow diagram that illustrates a process for testing a gateway that is coupled to a public-switched telephone network and that is associated with an emergency response service or system. The process of FIG. 3 may be performed by a network management system, such as NMS 120 (FIG. 1B), controlling one or more software agents, such as agent 114*c*, 114*d* (FIG. 1B).

At block 302, a phone system is registered, with an emergency response service, as a PSAP endpoint on the PSTN. For example, phone 116 (FIG. 1B) is registered as a PSAP communicatively coupled to PSTN 108. At block 304, the phone system is configured to answer incoming calls with a voice mail system, such as voice mail system 118 (FIG. 1B).

At block 306, a mapping is created, which maps a public emergency line number to a test emergency response location (ERL). For example, 911 calls from the phone system 102 are mapped for routing to a virtual ERL.

At block 308, the test ERL is registered with the emergency response service, such as ER 112. Thus, if functioning properly, upon being routed a 911 call, the ER 112 will use the mapping to determine that a 911 call from the phone system endpoint is to be routed to the test ERL, and will route the call accordingly.

At block 310, a call to a public emergency line number is initiated, such as a 911 call. At block 312, it is determined whether the call was routed to the phone system by a particular gateway being tested, such as gateway 104*b* (FIG. 1B). For example, by accessing the voice mail system 118 to which phone 116 was configured to route calls, an agent 114*d* can determine whether the call initiated at block 306 actually reached its destination. If the call was recorded by the voice mail system, then the gateway properly routed the call through PSTN 108 to the correct PSAP, which is phone 116 acting as the registered PSAP endpoint. If the call was not recorded by the voice mail system, then there is some operating error in the system.

If the process of FIG. 2A is performed before the process of FIG. 3, then the emergency response system 112 has already been tested. Thus, if there is an error which manifests itself during the process of FIG. 3, the gateway between the IP-based network 106 and the PSTN 108 is a likely source of the error, assuming the phone 116, voice mail system 118 and the agent 114*d* are all functioning properly.

4.0 Implementation Mechanisms

The following implementation mechanisms are non-limiting examples, which are related to a specific implementation. However, details may vary from implementation to implementation. Hence, the following sections are not to be construed to limit use of embodiments of the invention.

4.1 Hardware Overview

FIG. 4 is a block diagram that illustrates a computer system 400 upon which an embodiment of the invention may be implemented. One embodiment is implemented using one or more computer programs running on a network element such as a router device or gateway device. Thus, according to that embodiment, the computer system 400 is a router or gateway. One embodiment is implemented using one or more computer programs running on a telephone device. Thus, according to that embodiment, the computer system 400 is a telephone.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for monitoring a messaging system. According to one embodiment of the invention, message system monitoring is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for the techniques and functions that are described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for testing a gateway that is coupled to a public-switched telephone network and that is associated with an emergency response service, the method comprising the computer-implemented steps of:
    registering, with the emergency response service, a first agent as an endpoint, a phone as a Public Safety Answering Point (PSAP) endpoint, and a test location;
    configuring the phone to answer incoming calls with a voice mail system;
    mapping a public emergency line to the test location;
    initiating a call to the public emergency line from the first agent; and
    by accessing the voice mail system, determining whether the call was routed by the gateway through the public-switched telephone network to the phone as the PSAP.

2. The method of claim 1, wherein the steps of initiating and determining include initiating and determining automatically and periodically.

3. The method of claim 1, wherein the step of registering comprises registering the test location as an emergency response location (ERL) with the emergency response service.

4. The method of claim 3, wherein the step of registering comprises:
    configuring the ERL to route calls that are initiated to the public emergency line to the first agent as a Public Safety Answering Point (PSAP) endpoint; and
    wherein the step of determining whether the call was properly routed includes determining whether the call was routed by the ERL to the first agent as the PSAP endpoint.

5. The method of claim 4, further comprising the computer-implemented steps of:
    configuring the ERL to route calls that are initiated to the public emergency line to a third agent as an On Site Alert Number (OSAN) endpoint; and
    determining whether the call was properly routed by the emergency response service to the third agent.

6. The method of claim 3, further comprising the computer-implemented steps of:
    configuring the ERL to route calls that are initiated to the public emergency line to a third agent as an On Site Alert Number (OSAN) endpoint; and
    determining whether the call was properly routed by the emergency response service to the third agent.

7. The method of claim 1, further comprising the computer-implemented steps of:
    registering, with the emergency response service, a third agent as an On Site Alert Number (OSAN) endpoint; and
    determining whether the call was properly routed by the emergency response service to the third agent.

8. The method of claim 1, wherein the step of determining whether the call was properly routed by the emergency response service includes determining whether the call was properly routed at least in part through a Voice-Over-Internet-Protocol (VoIP) network.

9. The method of claim 1, wherein the steps of initiating and determining include initiating and determining automatically and periodically.

10. A computer-readable medium carrying one or more sequences of instructions for testing a gateway that is coupled to a public-switched telephone network and that is associated with an emergency response service, which instructions, when executed by one or more processors, cause the one or more processors to carry out the steps of:
    registering, with the emergency response service, a first agent as an endpoint, a phone as a Public Safety Answering Point (PSAP) endpoint, and a test location;
    configuring the phone to answer incoming calls with a voice mail system;
    mapping a public emergency line to the test location;
    initiating a call to the public emergency line from the first agent; and
    by accessing the voice mail system, determining whether the call was routed by the gateway through the public-switched telephone network to the phone as the PSAP.

11. The computer-readable medium of claim 10, wherein the steps of initiating and determining include initiating and determining automatically and periodically.

12. The computer-readable medium of claim 10, wherein the step of registering comprises registering the test location as an emergency response location (ERL) with the emergency response service.

13. The computer-readable medium of claim 12, wherein the step of registering comprises:
    configuring the ERL to route calls that are initiated to the public emergency line to the first agent as a Public Safety Answering Point (PSAP) endpoint; and
    wherein the step of determining whether the call was properly routed includes determining whether the call was routed by the ERL to the first agent as the PSAP endpoint.

14. The computer-readable medium of claim 13, wherein the instructions cause the one or more processors to carry out the further steps of:
- configuring the ERL to route calls that are initiated to the public emergency line to a third agent as an On Site Alert Number (OSAN) endpoint; and
- determining whether the call was properly routed by the emergency response service to the third agent.

15. The computer-readable medium of claim 13, wherein the instructions cause the one or more processors to carry out the further steps of:
- configuring the ERL to route calls that are initiated to the public emergency line to a third agent as an On Site Alert Number (OSAN) endpoint; and
- determining whether the call was properly routed by the emergency response service to the third agent.

16. The computer-readable medium of claim 10, wherein the instructions cause the one or more processors to carry out the further steps of:
- registering, with the emergency response service, a third agent as an On Site Alert Number (OSAN) endpoint; and
- determining whether the call was properly routed by the emergency response service to the third agent.

17. The computer-readable medium of claim 10, wherein the step of determining whether the call was properly routed by the emergency response service includes determining whether the call was properly routed at least in part through a Voice-Over-Internet-Protocol (VoIP) network.

18. The computer-readable medium of claim 10, wherein the steps of initiating and determining include initiating and determining automatically and periodically.

19. A system for testing a gateway that is coupled to a public-switched telephone network and that is associated with an emergency response service, the system comprising:
- means for registering, with the emergency response service, a first agent as an endpoint, a phone as a Public Safety Answering Point (PSAP) endpoint, and a test location;
- means for configuring the phone to answer incoming calls with a voice mail system;
- means for mapping a public emergency line to the test location;
- means for initiating a call to the public emergency line from the first agent; and
- means for determining, by accessing the voice mail system, whether the call was routed by the gateway through the public-switched telephone network to the phone as the PSAP.

20. A system for testing a gateway that is coupled to a public-switched telephone network and that is associated with an emergency response service, the system comprising:
- a network interface;
- a processor coupled to the network interface and receiving messages from a network through the network interface;
- a computer-readable medium comprising one or more stored sequences of instructions which, when executed by the processor, cause the processor to carry out the steps of:
  - registering, with the emergency response service, a first agent as an endpoint, a phone as a Public Safety Answering Point (PSAP) endpoint, and a test location;
  - configuring the phone to answer incoming calls with a voice mail system;
  - mapping a public emergency line to the test location;
  - initiating a call to the public emergency line from the first agent; and
  - by accessing the voice mail system, determining whether the call was routed by the gateway through the public-switched telephone network to the phone as the PSAP.

21. A system that can test a gateway that is coupled to a public-switched telephone network and that is associated with an emergency response service, the system comprising:
- a network interface;
- a processor coupled to the network interface and receiving messages from a network through the network interface;
- a computer-readable medium comprising one or more stored sequences of instructions which, when executed by the processor, cause the processor to carry out the steps of:
  - registering, with the emergency response service, a first agent as an endpoint, a phone as a Public Safety Answering Point (PSAP) endpoint, and a test location;
  - configuring the phone to answer incoming calls with a voice mail system;
  - mapping a public emergency line to the test location;
  - initiating a call to the public emergency line from the first agent; and
  - by accessing the voice mail system, determining whether the call was routed by the gateway through the public-switched telephone network to the phone as the PSAP.

* * * * *